Patented Dec. 23, 1952

2,623,002

UNITED STATES PATENT OFFICE 2,623,002

ASCORBIC ACID SOLUTION

Howard H. Fricke, Lake Villa, Ill., assignor to Abbott Laboratories

No Drawing. Application July 13, 1951, Serial No. 236,689

6 Claims. (Cl. 167—81)

My invention relates to the administration of vitamin C, the chemical name of which is ascorbic acid, and includes among its objects and advantages the production of a preparation which may be quickly and conveniently added to food, drink or medicine, and which, before such addition remains chemically stable and of full physiological effectiveness for long periods of time.

One of the common methods of administering ascorbic acid to undernourished children is to add it to some liquid, usually milk, which is then drunk in the ordinary way. About 1 gram of ascorbic acid is soluble in 3 cc. of water at room temperature or 25° C., and it is a simple matter to add 5 or 10 drops of a 10% solution of ascorbic acid in water to a glass of milk or a glass of water and the subsequent drinking gives the material administered full therapeutic effect. But water solutions of ascorbic acid decompose chemically and such a solution stored at room temperature at a drug store loses its potency so rapidly that it is impracticable to distribute the material in that way.

Ascorbic acid is stable for long periods of time in glycerine alone but the solubility of it is only 1%, i. e., 1 gram in 100 cc. of glycerine at 25° C., and thus a proper dosage would call for the addition of so much glycerine that the taste of the food would be spoiled. It is for this reason, i. e., low solubility, that ascorbic acid has not been administered in glycerine. Attempts to solve the problem by the addition of ethanol have proven unsuccessful as stable glycerine-ethanol solutions solubilize at best only about 3 per cent ascorbic acid. The use of water was avoided, for as pointed out above, it was well known that ascorbic acid decomposes rapidly in compositions available heretofore in the presence of water.

I have discovered that preparations in which the solvent is primarily glycerine with a minor percentage of water can be made up so as to have a satisfactory degree of permanence and that at the same time a sufficient concentration of the vitamin for convenient use. To provide stability I have discovered that the glycerine should make up at least 65 per cent by volume of the total volume of the composition, and to provide for solubility that the glycerine should not make up more than 85 per cent by volume of the total volume of the composition. The range of solvent vehicle employed in my compositions is thus about 65–85 per cent by volume of glycerine and the remainder water to bring the compositions up to 100% by volume.

I have discovered that the glycerine-water mixtures described above will dissolve and retain in solution at room temperatures more ascorbic acid than will dissolve in the corresponding quantities of the individual solvents present in the compositions. For example, I have discovered that 6–12% by weight of ascorbic acid (see Examples I and III below) will dissolve in compositions containing 85% glycerine by volume of the total volume of composition. As the glycerine content is lowered to a minimum of 65% and the amount of water increases, correspondingly greater amounts of ascorbic acid can be dissolved over and above that soluble in the 85% glycerine composition, and the resulting solutions are stable. Compositions of the present invention contain at least 6% by weight of ascorbic acid and are all characterized by greater concentrations of ascorbic acid than the total solubilities in the individual solvents present in the composition.

The following examples will serve for illustrative purposes:

Example I 10 cc. of water are boiled and permitted to cool to about 60° C. Next 6 grams of powdered ascorbic acid are stirred into the hot water until dissolved. Glycerine at room temperature is then poured slowly into the resulting solution with continued stirring until 85 cc. of glycerine have been added. Finally, additional water (about 2 cc.) is added to bring the composition up to 100 cc. This preparation which is stable at room temperature, contains 85 cc. of glycerine which should dissolve 0.85 gram of ascorbic acid and a total of 12 cc. of water which should dissolve 4 grams of ascorbic acid. However, the preparation contains 6 grams of ascorbic acid, i. e., 1.15 grams more of ascorbic acid than the total solubilities in the individual solvents present in the composition.

Example II 200 cc. of water are thoroughly boiled and permitted to cool to about 60° C. 100 grams of crystalline or powdered ascorbic acid are stirred into the water and dissolve quickly. Glycerine at room temperature is poured slowly into the mixture with continued stirring until 750 cc. of glycerine have been added. This addition lowers the temperature so that it is only slightly above room temperature. Finally additional boiled water is added to bring the volume up to 1,000 cc., and the product is ready for bottling. Thus by following the procedure a product is obtained having 75% glycerine by volume of the total volume. The final preparation contains 10% by weight of ascorbic acid, which is also more than the amount capable of being dissolved in corresponding amounts of the individual solvents.

*Example III*

6 cc. of water are boiled to remove dissolved oxygen. Next, 12 grams of powdered ascorbic acid are added and stirred into the hot water. Add 85 cc. of glycerine and stir with gentle warming until the ascorbic acid is dissolved. Finally, additional water (about 2 cc.) is added to bring the composition up to 100 cc. This preparation, which is stable at room temperature, contains 85 cc. of glycerine which should dissolve 0.85 gram of ascorbic acid and a total of 8 cc. of water which should dissolve about 2.6 grams of ascorbic acid. The preparation, however, contains 12 grams of ascorbic acid, i. e., about 8.5 grams more of ascorbic acid than the total solubilities in the individual solvents present in the composition.

*Example IV*

10 cc. of water are boiled to remove the dissolved oxygen. Next, 8 grams of ascorbic acid are added and stirred into the hot water. 85 cc. of glycerine is then added and stirred with gentle warming until the ascorbic acid is dissolved. Finally, additional water is added to bring the composition up to a volume of 100 cc. This composition, which is stable at room temperature, contains 85 cc. of glycerine and enough water to bring the total volume of preparation up to 100 cc. The preparation contains more ascorbic acid than the total solubilities of individual solvents present in the composition.

*Example V*

In accordance with the procedure of Example IV using, however, 12 grams of ascorbic acid and 75 cc. of glycerine, there is obtained a preparation which is stable at room temperature containing 12% ascorbic acid and 75% glycerine. The preparation contains more ascorbic acid than the total solubilities of the individual solvents present in the composition.

It is desirable in producing commercial quantities to work in an inert atmosphere beginning with the addition of the ascorbic acid up to and including the bottling, thus avoiding oxidation of the ascorbic acid. Nitrogen or carbon dioxide is a suitable medium for such work.

I have found that a preparation containing about 75% glycerine by volume, as in Example II, constitutes the preferred embodiment of the invention. Such a preparation is both stable for long periods of time and yet contains the desired high concentration of ascorbic acid. Such a preparation exhibits the true "elegance" sought for by the pharmaceutical industry in its products.

In expressing the concentration of the ascorbic acid in the solution, reference has been made to percent by weight of ascorbic acid. It is to be understood that this expression refers to weight of ascorbic acid in volume of liquid, i. e., grams of ascorbic acid per 100 cc. volume of solution. This is merely a way of expressing the conventional percent weight in volume relationship (w./v.).

The present application is a continuation-in-part of my copending application, Serial No. 78,009, filed February 23, 1949, which is, in turn, a continuation-in-part of my earlier application, Serial No. 645,479, filed February 4, 1946, now abandoned.

Others may readily adapt the invention for use under various conditions of service, by employing one or more of the novel features disclosed, or equivalents thereof. As at present advised with respect to the apparent scope of my invention, I desire to claim the following subject matter.

I claim:

1. A therapeutic composition containing at least about 6% by weight of ascorbic acid dissolved in a solvent consisting of glycerine and water, the proportion of the ingredients of the solvent being about 65-85% by volume of glycerine and the remainder water to bring the composition up to 100% by volume, said composition having a greater concentration of the ascorbic acid in solution than the total solubility of the ascorbic acid in the respective individual ingredients of the said solvent present in the composition.

2. A therapeutic composition containing about 6% by weight of ascorbic acid dissolved in a solvent consisting of glycerine and water, the proportion of the ingredients of the solvent being about 85% by volume of glycerine and the remainder water to bring the composition up to 100% by volume, said composition being characterized by greater concentration of the ascorbic acid than the total solubilities in the individual solvents present in the composition.

3. A therapeutic composition containing about 8% by weight of ascorbic acid dissolved in a solvent consisting of glycerine and water, the proportion of the ingredients of the solvent being about 85% by volume of glycerine and the remainder water to bring the composition up to 100% by volume, said composition being characterized by greater concentration of the ascorbic acid than the total solubilities in the individual solvents present in the composition.

4. A therapeutic composition containing about 12% by weight of ascorbic acid dissolved in a solvent consisting of glycerine and water, the proportion of the ingredients of the solvent being about 75% by volume of glycerine and the remainder water to bring the composition up to 100% by volume, said composition being characterized by greater concentration of the ascorbic acid than the total solubilities in the individual solvents present in the composition.

5. A therapeutic composition containing about 12% by weight of ascorbic acid dissolved in a solvent consisting of glycerine and water, the proportion of the ingredients of the solvent being about 85% by volume of glycerine and the remainder water to bring the composition up to 100% by volume, said composition being characterized by greater concentration of the ascorbic acid than the total solubilities in the individual solvents present in the composition.

6. A therapeutic composition containing about 10% by weight of ascorbic acid dissolved in a solvent consisting of glycerine and water, the proportion of the ingredients of the solvent being about 75% by volume of glycerine and the remainder water to bring the composition up to 100% by volume, said composition being characterized by greater concentration of the ascorbic acid than the total solubilities in the individual solvents present in the composition.

HOWARD H. FRICKE.

(References on following page)

REFERENCES CITED

The following references are of record in the file of this patent:

UNITED STATES PATENTS

| Number | Name | Date |
|---|---|---|
| 2,377,188 | Schwenk | May 29, 1945 |
| 2,407,624 | Bird | Sept. 17, 1946 |
| 2,421,593 | Buxton | June 3, 1947 |

FOREIGN PATENTS

| Number | Country | Date |
|---|---|---|
| 272,376 | Great Britain | June 16, 1927 |

OTHER REFERENCES

Goodman: Cosmetic Dermatology (1936), pages 198 to 200.

Chemical Abstracts, volume 37, page 6714 (1943).

Rosenberg: Chemistry and Physiology of Vitamins (1942), page 295.

U. S. Dispensatory, 23d edition (1943), page 493.